United States Patent [19]

Deutsch et al.

[11] Patent Number: 5,348,622

[45] Date of Patent: Sep. 20, 1994

[54] SOLAR WATER PURIFICATION DEVICE

[76] Inventors: David Deutsch; Thomas C. Flores, both of c/o Allen Dempster; 200 California St.; Third Floor, San Francisco, Calif. 94111

[21] Appl. No.: 120,413

[22] Filed: Sep. 14, 1993

[51] Int. Cl.⁵ ............................. B01D 3/42; C02F 1/14
[52] U.S. Cl. ................................. 202/176; 202/177; 202/180; 202/181; 202/185.4; 202/190; 202/206; 202/234; 202/266; 202/267.1; 126/569; 126/595; 126/635; 126/698; 203/1; 203/2; 203/10; 203/22; 203/86; 203/DIG. 1; 203/DIG. 18; 203/DIG. 22
[58] Field of Search ............... 203/DIG. 1, DIG. 17, 203/86, 22, DIG. 18, 1, 2, 10, DIG. 22; 202/177, 190, 234, 176, 178, 180, 185.4, 267.1, 181, 266, 160; 126/422, 423, 427, 440, 901

[56] References Cited

U.S. PATENT DOCUMENTS

| | | | |
|---|---|---|---|
| 2,490,659 | 12/1949 | Snyder | 203/DIG. 1 |
| 3,330,740 | 7/1967 | Duffy | 203/DIG. 1 |
| 3,840,437 | 10/1974 | Awan et al. | 202/160 |
| 4,110,172 | 8/1978 | Spears | 202/234 |
| 4,487,659 | 12/1984 | Stark | 203/DIG. 1 |
| 4,504,362 | 3/1985 | Kruse | 203/3 |
| 4,731,175 | 3/1988 | Funk et al. | 202/160 |
| 5,053,110 | 10/1991 | Deutsch | 203/DIG. 1 |
| 5,132,918 | 7/1992 | Funk | 203/2 |
| 5,133,837 | 7/1992 | Elmore et al. | 202/185.1 |
| 5,181,991 | 1/1993 | Deutsch | 203/DIG. 1 |

*Primary Examiner*—Wilbur Bascomb, Jr.
*Attorney, Agent, or Firm*—Cornelius J. Husar

[57] ABSTRACT

This disclosure relates to an improved solar water purification system and process wherein the evaporating, condensing and distillate collecting chambers are located underground to assist in the evaporation and condensation process. The system includes three computer controlled preheaters which are constantly monitored to determine the temperature of the load therein. The cycling and recycling of the load relative to the load tank and the three preheaters is controlled by the computer for optimum system efficiency. One of the three preheaters is located underground, while a second preheater is located externally as a solar preheater and the third preheater is an outside gas, oil or waste heat fired preheater. In addition to producing pure water through the evaporation process, there is disclosed a system and process whereby various contaminants may be captured for further processing, storage and exploitation.

12 Claims, 10 Drawing Sheets

SOLAR WATER PURIFICATION DEVICE

This application is related to U.S. Pat. Nos. 5,053,110 and 5,181,991, both issued to David Deutsch, one of the co-inventors of the subject application.

BACKGROUND OF THE INVENTION

As the global human overpopulation crisis continues to intensify, the planet is beginning to feel the strain on its carrying capacity. One of the most obvious and most dire symptoms of this emergency is the human impact on fresh water supply. Not only do more people demand drinking water, but their industrial and agricultural needs for this commodity more than proportionally increase with population rise. Even as demand rises, the supply is mindlessly diminished through careless destruction of natural habitat that serves to catch and retain accumulated rainfall in its clean and unpolluted state, and through nearsighted contamination and pollution of such decreasing resources as still exist. Further still, human environmental impact now has a global, climatological reach, and many well respected minds express concern that such an impact will wreak havoc on the reliability of rainfall in heavily populated areas. Not only are shortages being experienced in overpopulated desert and semi-arid locales, but even well watered communities are already experiencing periods of artificially-induced droughts. In a nutshell, there is too little clean water, and more polluted water than we know what to do with. This symptom of the population crisis intersects with another: the needlessly single-use exploitation of very finite mineral and chemical resources which invariably are converted to "waste" and which find their way into solid dumps, our air, and, needless to say, our water. Even aside from the shortage of water or front the dangers of toxic contaminant proliferation, the senseless, cavalier, single-use attitudes to these resources alone is cause for concern.

The present invention has been designed to help address all these concerns, while expending as little valuable commercial energy as possible. It provides a means by which seawater or contaminated fresh water (henceforward both collectively referred to as "load water" or "load") can be processed to separate the water from its contaminants, including salt. Thus, the products of this process are 1.) fresh water and 2.) dry contaminants. Due to the solid state of the latter after processing, they are then amenable to further commercial treatment for reexploitation. Even where such post-process treatment cannot be undertaken or must be delayed, storage of these dry materials in their solid state takes up less space, is more safely accomplished with less risk of groundwater or other contamination, and does not pointlessly lock up fresh water in the storage process. The invention described herein will not effectively remove microorganisms, nor is it designed to extract volatile substances. Nevertheless, these contaminants are easily removed before and after the use of the instantly disclosed device through standard sterilization (i.e. chlorination, UV, ozone treatments, etc.) and aeration processes well known to the water-treatment industry.

The apparatus disclosed in this application incorporates improvements and modifications over earlier patents granted to one of the applicants of the instant application, and like those earlier designs seeks to exploit solar and other sources of energy to minimize, and in some cases eliminate, the need to consume commercial energy which is largely produced from ecologically unsound sources. The main changes reflected in the instant application are directed to further increasing the efficiency of 1.) the condensation process within the domed upper structure, 2.) the recovery of waste heat, 3.) the exploitation of solar/ambient heat, and 3.) the flexible use of various commercial heat sources. Additionally, various design improvement are also intended to reduce construction and maintenance costs.

SUMMARY OF THE INVENTION

Applicants' improved water purification apparatus uses an interconnected network of three computer-controlled preheaters: heat exchange, ambient/solar, and commercial respectively. The first two are used to exploit non-commercial energy (i.e. waste-heat recovery, solar/ambient) to heat load as much as possible, prior to allowing the third preheater to expend commercial energy to add any additional heat needed to process the load. The controlling computer monitors the load temperature at various points throughout the system, allowing it to flexibly and continuously select and change the flow routes of load through different combinations of preheaters, in a manner most likely to reduce the commercial-energy burden of the third preheater. The first preheater shape and piping have been modified not only to increase recovery of waste heat, but also to enhance condensation and increase distillate production, and to improve structural stability. Further, the second preheater has been completely redesigned to better trap infrared radiation, and to more efficiently use the heat it receives from previously-heated load.

Other improvements in associated piping and structural design have been introduced into the present system and will be discussed in greater detail below.

OBJECTS OF THE INVENTION

An object of the invention is the provision of a water purification device with a domed upper condensation structure having an interior surface with improved condensation capabilities.

A further object of the invention is the provision of such a domed upper structure having an exterior surface with increased heat transfer features via an improved first preheater chamber which completely encapsulates said domed upper structure.

Another object of the invention is the provision of such an improved first preheater chamber which, by significantly reducing the interior surface temperature of the domed upper structure to increase the condensation thereon, also efficiently recaptures energy previously expended to vaporize load.

Yet another object of the invention is the provision of an improved solar collector with greater capacity to absorb and retain ambient/solar infrared radiation.

These and other objects of the instant invention will now become more apparent hereinafter. The instant invention will now be described with particular reference to the accompanying drawings which form a part of this specification wherein like reference characters designate the corresponding parts in the several views.

DETAILED DESCRIPTION OF THE DRAWINGS

Figure 1:
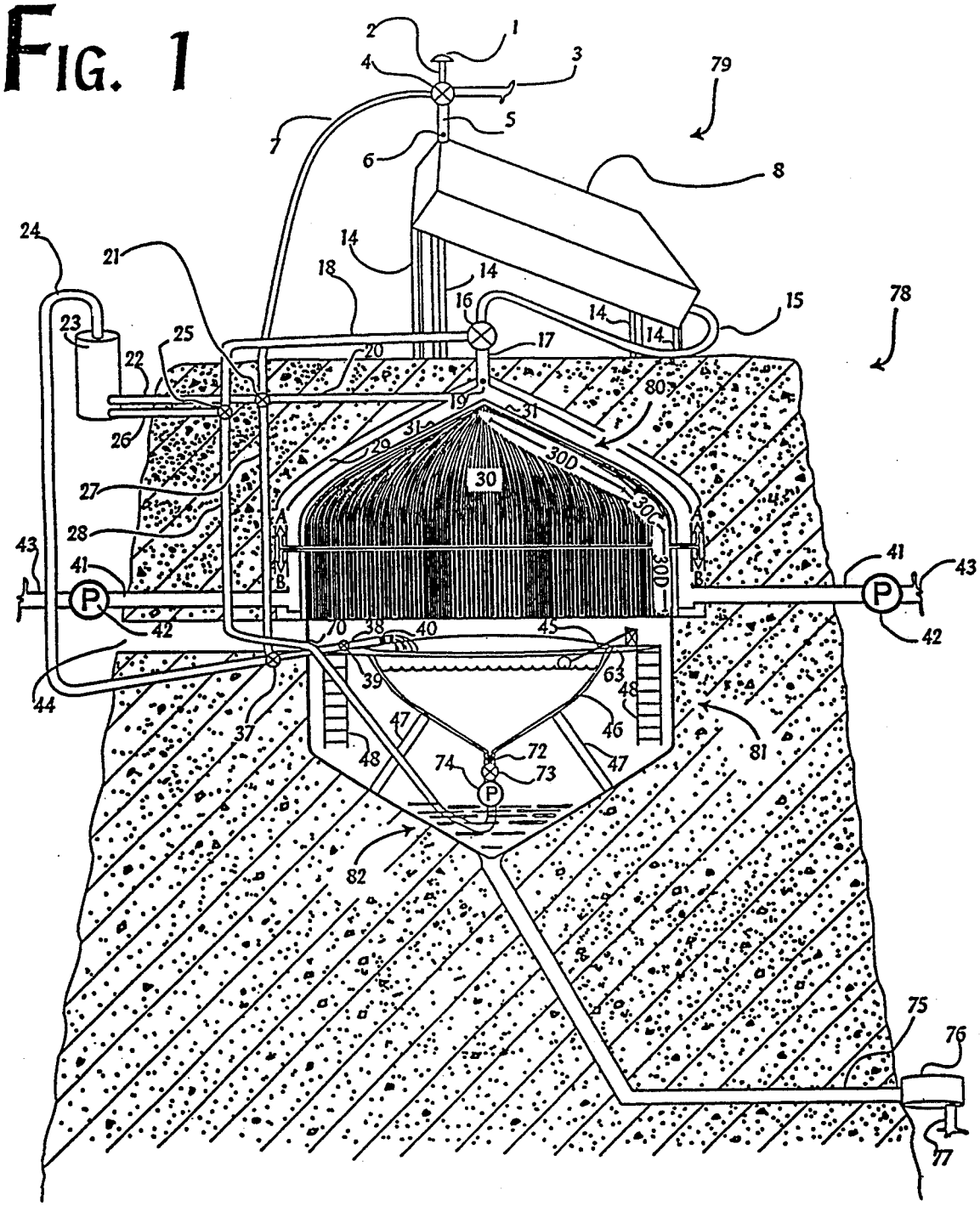
FIG. 1 is a vertical sectional view illustrating the overall configuration of the improved water purification apparatus.

Turning first to FIG. 1, there is shown a vertical sectional view of the improved solar water purification device generally indicated by reference numeral 78. Except for second preheater 79, third preheater 23, and distillate storage tank 76, which are positioned aboveground together with various connecting conduits and related plumbing, the entire water purification device 78 is positioned below the earth's surface. Underground placement can be effected by mounding as shown by this embodiment, or by burial outright, although the former facilitates access for maintenance, construction, and distillate recovery. An access tunnel 44 leads to door access 70 into the underground portions of the apparatus.

The main underground components of the device are a condensation chamber 81, con, posed of a densely-corrugated condensing domed upper structure 30 and a lower condensate collecting structure 82 (henceforward, "dome" and "condensate collecting tank" respectively). Dome 30 is composed of an efficient heat-conducting material, such as copper, whereas condensate collecting tank 82 may be made of any structurally-sound, non-metallic building material. Each of the dome 30 and condensate collecting tank 82, starting at the horizontal midpoint, are comprised of a first vertical portion 30B, followed by an arcuate portion 30C and then terminating in a converging straight portion 30D. Both dome 30 and condensate collecting tank 82 are mirror images of each other, except that the latter lacks the dense corrugations which characterize the former. The dense vertical corrugations 30A of dome 30 are gradually feathered in as the walls spread out from the apex towards the downwardly arcuate curve, thereby filling in the expanded area available for corrugation. FIG. 1 depicts corrugations 30A as ending immediately above the level of access tunnel 44, however, this is done merely for purposes of illustrative clarity. Indeed, it would be advantageous to extend the corrugations 30A slightly, such that they reach just below the level of walkway 63 (see description below). Although corrugations 30A could be extended to also include the entire condensate collecting tank 82, such an approach merely adds materials and manufacturing expense.

Dome 30 is structurally strengthened by support frame 31, located adjacent to the external surface of dome 30, and will be discussed in greater detail in regard to FIGS. 12 and 13. Dome 30 and support frame 31 are encapsulated by first preheater 80, a heat-exchange chamber bounded by the external surface of dome 30 and by outer tank wall 29. Outer tank wall 29 is shaped to follow the arcuate contours of dome 30. A pair of inlet conduits 41 are located diametrically opposed to each other at the lowest levels of first preheater 80, and are each preceded by pumps 42 and conduits 43, which introduce contaminated water loads (henceforward, "load") into the device for processing. Load is pumped by this route from its place of storage (not shown) and fills first preheater 80, thereby coming into direct contact with the external surface of dome 30. Said surface contains varying degrees of heat due to the vapor-condensation process, described below, taking place on the inner surface of dome 30. Because of this direct contact with the external surface of dome 30, the load absorbs heat contained by said surface.

As the load water absorbs heat, it rises with relation to cooler surrounding load and tends to form a strata or pool of warmer load at the upper apex of first preheater 80. Temperature sensor 19 is located at said upper apex to monitor the temperature level of said warmest strata. Said upper apex of first preheater 80 is further connected to conduit 17, which in turn is connected to two-position switching valve 16. One position allows load from conduit 17 to flow into second preheater 79 via conduit 15. The other position of switching valve 16 blocks exit of load via conduit 17, and allows load arriving from the recycling system via conduit 18 to pass through to second preheater 79. Load from either source progresses via conduit 15 into second preheater 79, whose housing 8 is positioned so only one of its corners is lowermost, said corner being the point of entry for conduit 15. Housing 8 of second preheater 79 is provided with four supports 14. While in second preheater 79, load absorbs further heat from ambient and solar infrared radiation, thereby rising to the apex of housing 8. As was the case with first preheater 80, the warmest load tends to pool at said upper apex of housing 8, where temperature sensor 6 monitors the temperature level of said warmest strata. While in second preheater 79, various gasses which might form due to chemical processes will similarly pool at said apex.

Conduit 5 is connected to said upper apex of second preheater 79, and is in turn connected to three-position switching valve 4. Where ecologically appropriate, one position of switching valve 4 allows the aforementioned pooled gasses to pass through conduit 2 and vent into the atmosphere via pressure relief valve 1. A second position of switching valve 4 routes pooled gasses via conduit 3 to a storage device (not shown). The third and final position of switching valve 4 is used only for removal of heated load strata at the upper apex of housing 8. In this position, load progresses through conduit 7 to three-position switching valve 21.

Switching valve 21 is fed not only by conduit 7, but also by conduit 20 which originates at the upper apex of first preheater 80. Switching valve 21 directs these two alternate sources of load into two diverging routes. Depending on the load temperature, switching valve 21 either detours the load to third preheater 23 via conduit 22 for additional heating, or directs the load towards entry into condensation chamber 81 via conduit 27. In the first instance, load travels down conduit 22 to third preheater 23, where it is provided with any needed additional heat which the first and second preheaters 80 and 79 failed to adequately supply. Since this function can be met by a variety of components (ranging from, but not limited to, commercial gas or propane heaters to large cogeneration plants producing hot water as a byproduct of electrical power), third preheater 23 is intentionally represented generically in FIG. 1 as a cylinder. When heat is added as needed, the load exits third preheater 23 via conduit 24 leading to two-position switching valve 37. Before continuing, it should be noted that placement of third preheater 23 above ground as a modular component of the system enhances access and ease of maintenance as well as allowing the operator a greater range of commercial energy sources to choose from. This adds flexibility to construction and placement of the overall apparatus.

As discussed moments ago, switching valve 21 manages two alternate load output paths: one towards third preheater 23 and another through conduit 27. These divergent paths meet at switching valve 37. In one position, switching valve 37 directs load from conduit 27 into condensation chamber 81, while in the other position conduit 27 is blocked to allow conduit 24 to flow freely into condensation chamber 81. From switching valve 37, load enters condensation chamber 81 via conduit 38. Sufficiently heated load is discharged into load tank 46, positioned in the lower half of condensation chamber 81. Floating water-level sensor 45 determines when load tank 46 is full, and activates the closure of shut-off valve 39, stopping further load discharge through conduit 38. Temperature sensor 40, located near the discharge point of conduit 38, monitors the temperature of discharged load.

Much of the internal composition of condensation chamber 81 is better seen and discussed in connection with FIGS. 3–11, but the following components are visible in FIG. 1. Surrounding half of the perimeter of the load tank 46 rim, is semicircular walkway 63. Attached to each terminus of walkway 63 are downward mounted maintenance ladders 48. Load tank 46 is held in place by supports 47. At the lowermost point of load tank 46 is temperature sensor 72, which monitors load for cooling. When excessive cooling occurs, shut-off valve 73 opens and pump 74 is activated, pulling cooled load from the bottom of load tank 46 through conduit 28 to two-position switching valve 25. From switching valve 25, load is reheated and recycled through the system either through conduit 26 to third preheater 23, or by way of conduit 18 to second preheater 79.

Condensate formed on inner surface of dome 30 accumulates in collecting tank 82 and is drained by conduit 75 directly into distillate storage tank 76 located above ground. The precise above-ground location of distillate storage tank will vary depending on whether underground placement of condensation chamber 81 is done by mounding, as shown in the instant embodiment, or by burial. From distillate storage tank 76, the distilled product is removed to its ultimate destination via conduit 77.

Figure 2:
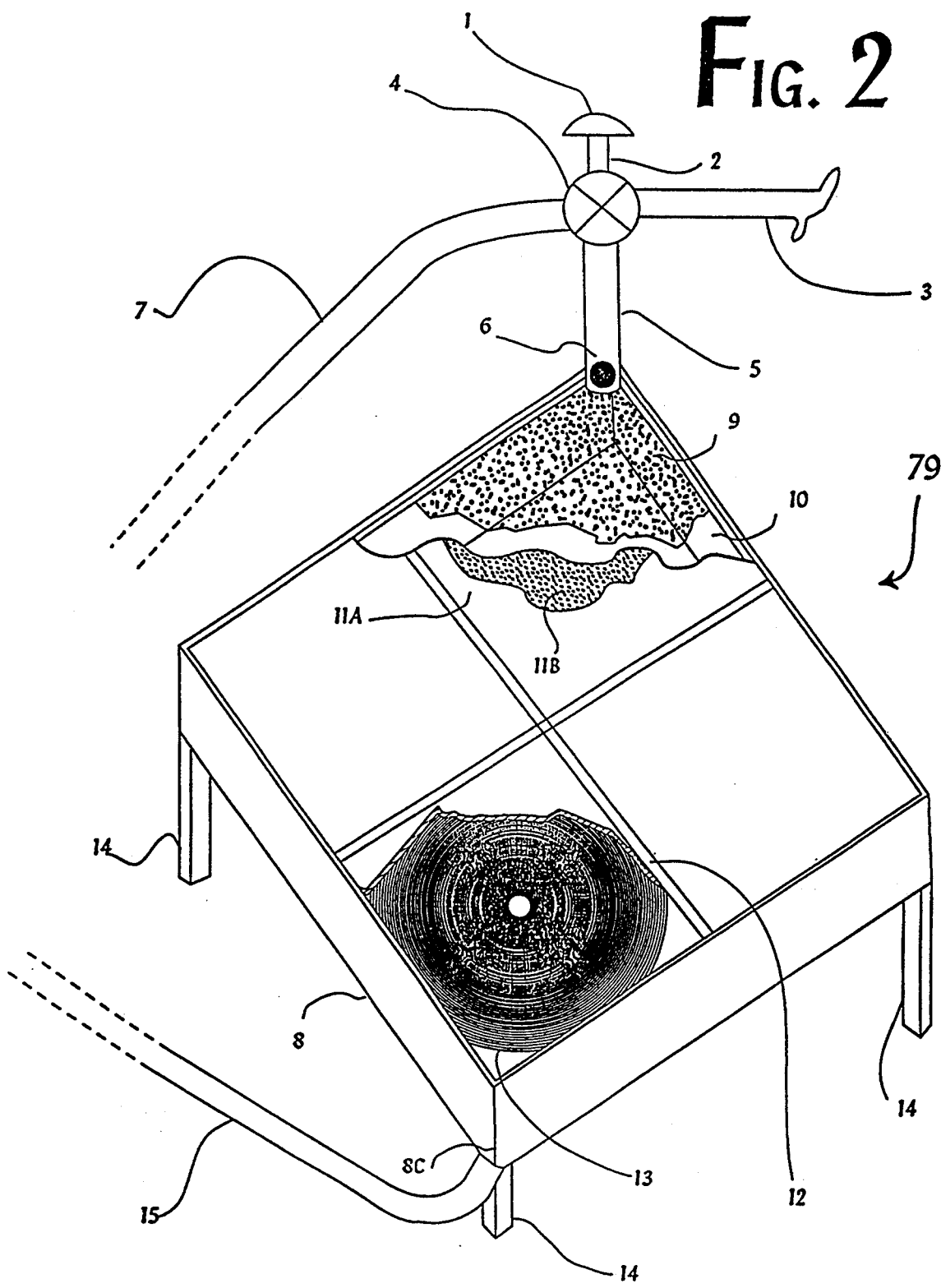
FIG. 2 is an enlarged detailed view per se of preheater #2 (solar), which is illustrated in FIG. 1.

I refer now to FIG. 2, an enlarged frontal view of second preheater 79, which is a solar and ambient heat-collecting unit. As illustrated, the main body of second preheater 79 is comprised of a rectangular housing 8 having two pairs of oppositely disposed sides. Only one corner 8C is lowermost, the other three being uppermost, all of which are provided with supports 14 of varying heights appropriate to keeping housing 8 in this position while maintaining stability and balance. Incoming load conduit 15 enters housing 8 at its lowermost corner 8C. The inside of housing 8 is depicted as a progressive cut-away view, with the innermost surface of housing 8 being a black-painted floor or base 9. Immediately over base 9, is a coating of infrared-absorbent polymer 10. All four sides of housing 8 are treated in like manner. The top of housing 8 is enclosed with a plurality of low-emissivity glass panes 11, with uncoated external pane-surface 11A and inner pane-surface 11B with low-emissivity coating shown. Panes 11 are each covered in turn by Fresnel lenses 13. However, only the pane adjacent to lowermost corner 8C is shown with a Fresnel lens 13. Both panes 11 and Fresnel lenses 13 are held in place by frame members 12. Conduit 5 is attached to the uppermost apex of housing 8 where temperature sensor 6 is also located. Switching valve 4 and the conduits attached to it are all depicted in the same manner as FIG. 1.

Figure 3:
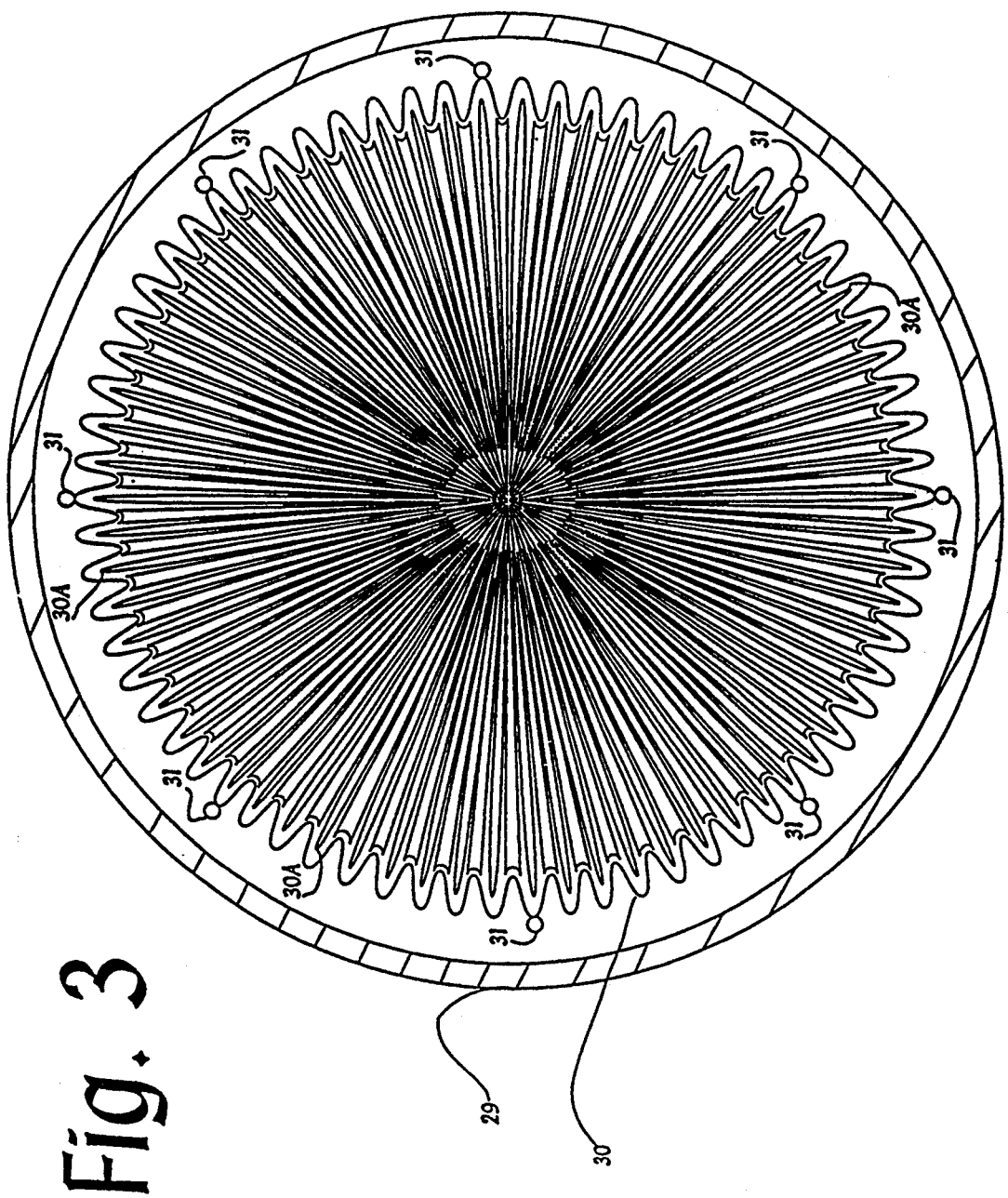
FIG. 3 is a horizontal sectional view looking up and taken along the plane A—A of FIG. 1, illustrating the corrugations of the domed upper structure of preheater #1.

Turning to FIG. 3, a sectional, view of condensation chamber 81 is shown, providing an upwardly directed perspective towards the apex of dome 30. Outermost cross-hatched circle is outer tank wall 29 of first preheater 80. The dense corrugations 30A of dome 30 are clearly illustrated in this figure. Also visible are the buttresses of support frame 31, spaced evenly around dome 30.

Figure 4:
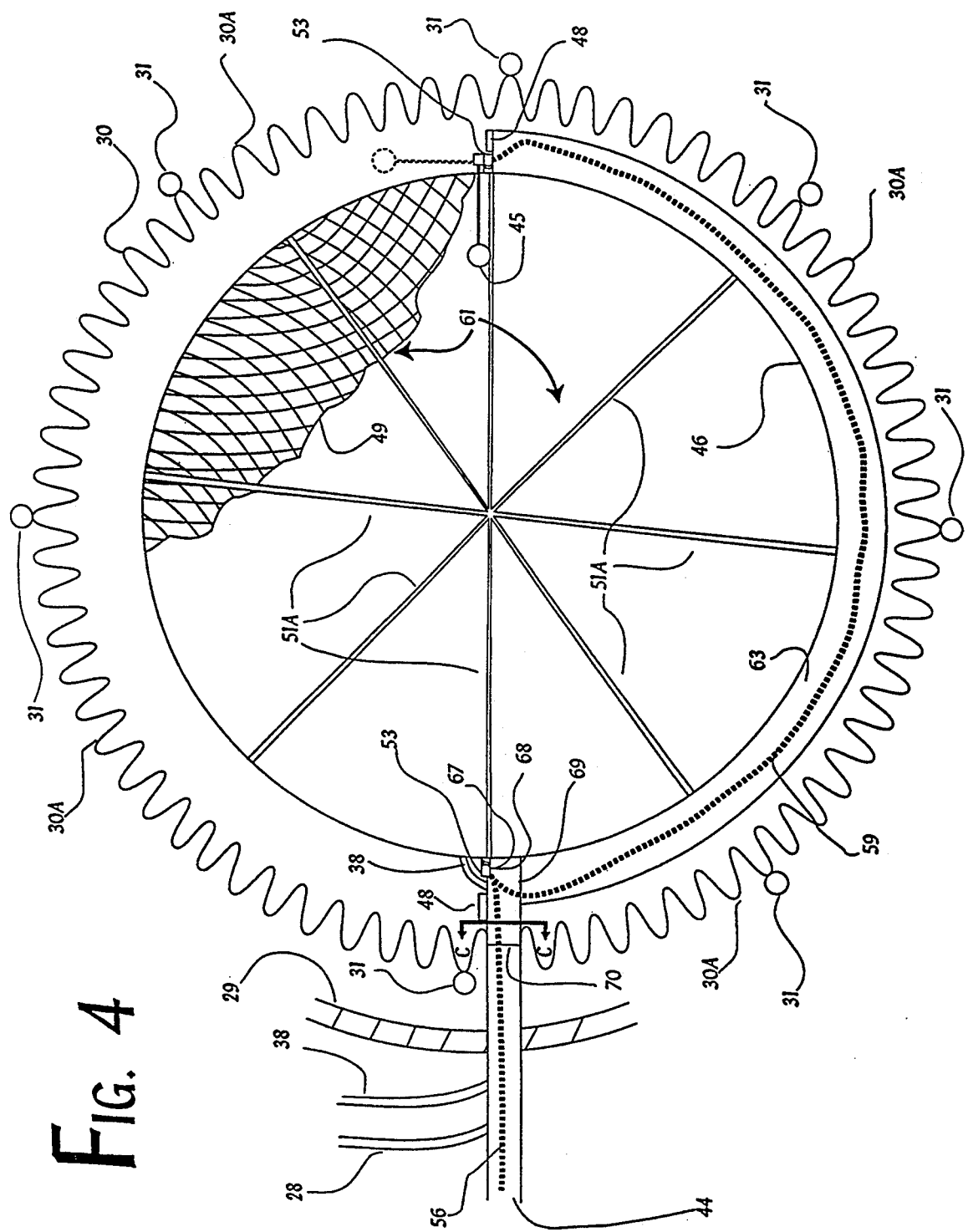
FIG. 4 is a horizontal sectional view looking down and taken along the plane B—B of FIG. 1 illustrating the placement of the load tank, filtering system and walkway (illustrated in FIGS. 6-11) with relation to the dome walls and door access.

FIG. 4 offers a plan view of condensation chamber 81 as indicated by arrows B—B of FIG. 1. However, its perspective is downward towards load tank 46, and is slightly enlarged over FIG. 3. Here, too, the corrugations 30A of dome 30 are visible, as are the buttresses of support frame 31. Outer tank wall 29 is illustrated only in part to the left of the drawing. The circumference of load tank 46 occupies most of the area of dome 30. To one side of load tank 46, semi-circular walkway 63 occupies most of the remaining space, although it does not actually contact the walls of dome 30. Hidden by walkway 63, while following its contour, electrical supply 59 (shown as a dotted line) feeds power to motors 54, located underneath and at each terminus of walkway 63. The perspective of FIGS. 6 and 10 better serves to depict the location of motors 54, and so are not shown here to preserve illustrative clarity. To the left of FIG. 4, at the terminus of walkway 63 and directly adjacent to it, rectangular gangplank 69 completely bridges the space between load tank 46 and door access 70, through to access tunnel 44. Maintenance ladders 48 are illustrated as rectangles, one at the terminus of walkway 63 farthest from door access 70, and the other located adjacent to the side of gangplank 69 opposite from walkway 63.

Conduit 38, from which load tank 46 is supplied, emerges from beneath gangplank 69, and terminates at the edge of load tank 46. The course of conduit 38 prior to said emergence, runs below gangplank 69 and access tunnel 44 via door access 70, exiting access tunnel 44 after outer tank wall 29 is cleared. Similarly, the view of conduit 28 inside condensation chamber 81 is hidden entirely by these same structures, as well as by load tank 46. To preserve clarity, the course of both conduits 38 and 28 are not shown except where their view is not hidden by other structures. For better perspective on the location and relative placement of these conduit features, turn to FIGS. 1, 5, 6 and 10. Also running below gangplank 69 and access tunnel 44 via door access 70, is electrical supply 56 (shown as a dotted line), which is connected to and is the main source of power to all electrical supply lines inside condensation chamber 81, including the aforementioned electrical supply 59.

Inside the perimeter of load tank 46 can be seen the downwardly-oriented, converging spokes 51A of frame 51. A cut-away view shows filter net 49 which, in combination with frame 51, provides a precipitate-filtering means 61 for the instant apparatus. Said filter net 49 is of an extremely fine weave, although this is not depicted in these drawings to preserve illustrative clarity. Adjacent to gangplank 69 and the opposite terminus of walkway 63, are two towers 53 which assist in the movement of the aforementioned precipitate-filtering means 61. Also adjacent to the terminus of walkway 63, opposite door access 70, is water-level sensor 45, which can be moved aside as illustrated here, to allow free up and down movement of said precipitate-filtering means 61. All of the features described in this paragraph thus far, are better visible in FIGS. 6 and 10. Lastly, on-off switches 67 and 68 are both located on the tower 53 nearest door access 70, and these control the electrical activation of a plurality of solenoids 52 (discussed below) and motors 54, respectively.

Figure 5:
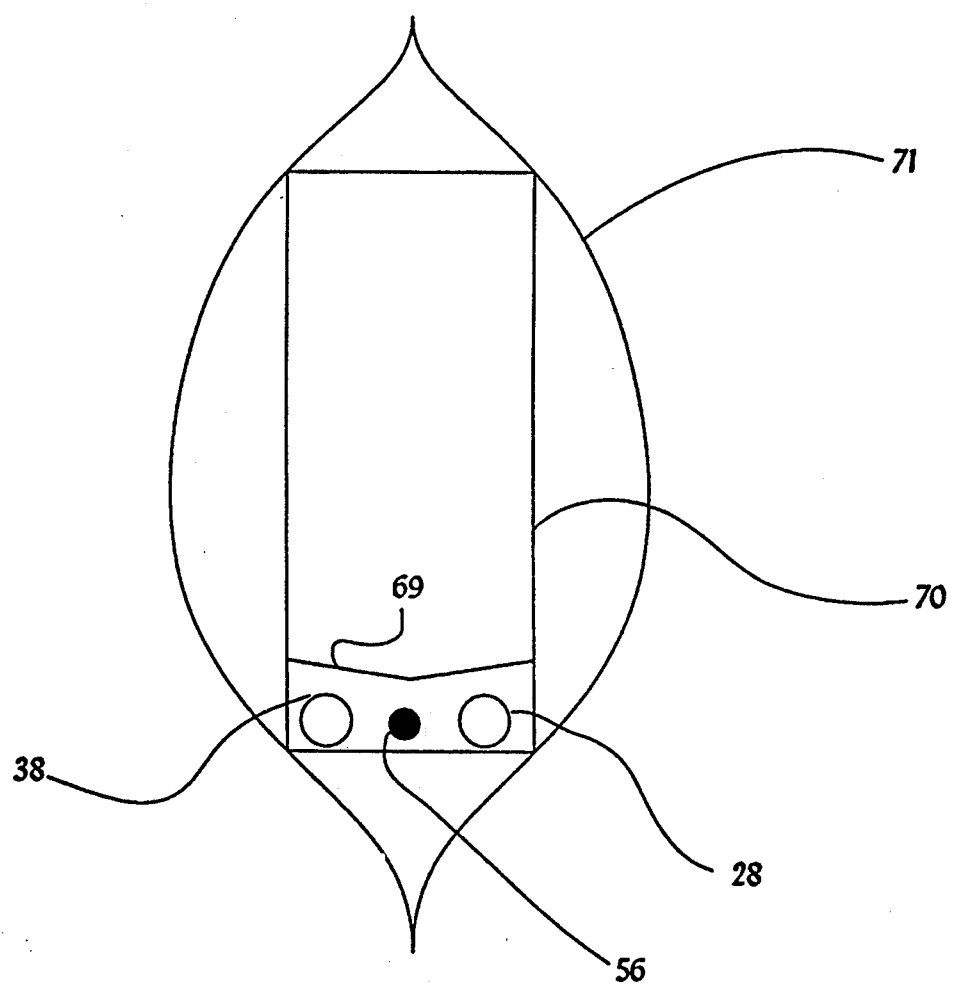
FIG. 5 is a vertical sectional view taken along the plane C—C in FIG. 4, of the entry-egress area, showing placement of electrical and plumbing access.

With reference to FIG. 5, there is shown an enlarged frontal elevational view of the area immediately surrounding door access 70, it may be seen that said feature is enclosed within an awning 71. This awning 71 extends into condensation chamber 81, and diverts the flow of condensate progressing down towards condensate collecting tank 82, such that the condensate is not blocked by door access 70 or its related structures. Gangplank 69 is located within and near the bottom of door access 70, and is shown to have a central depression down its center. Below gangplank 59, conduits 38 and 28 are shown exiting and entering condensation chamber 81, respectively. Also below gangplank 69 is electrical supply 56.

Figure 6:
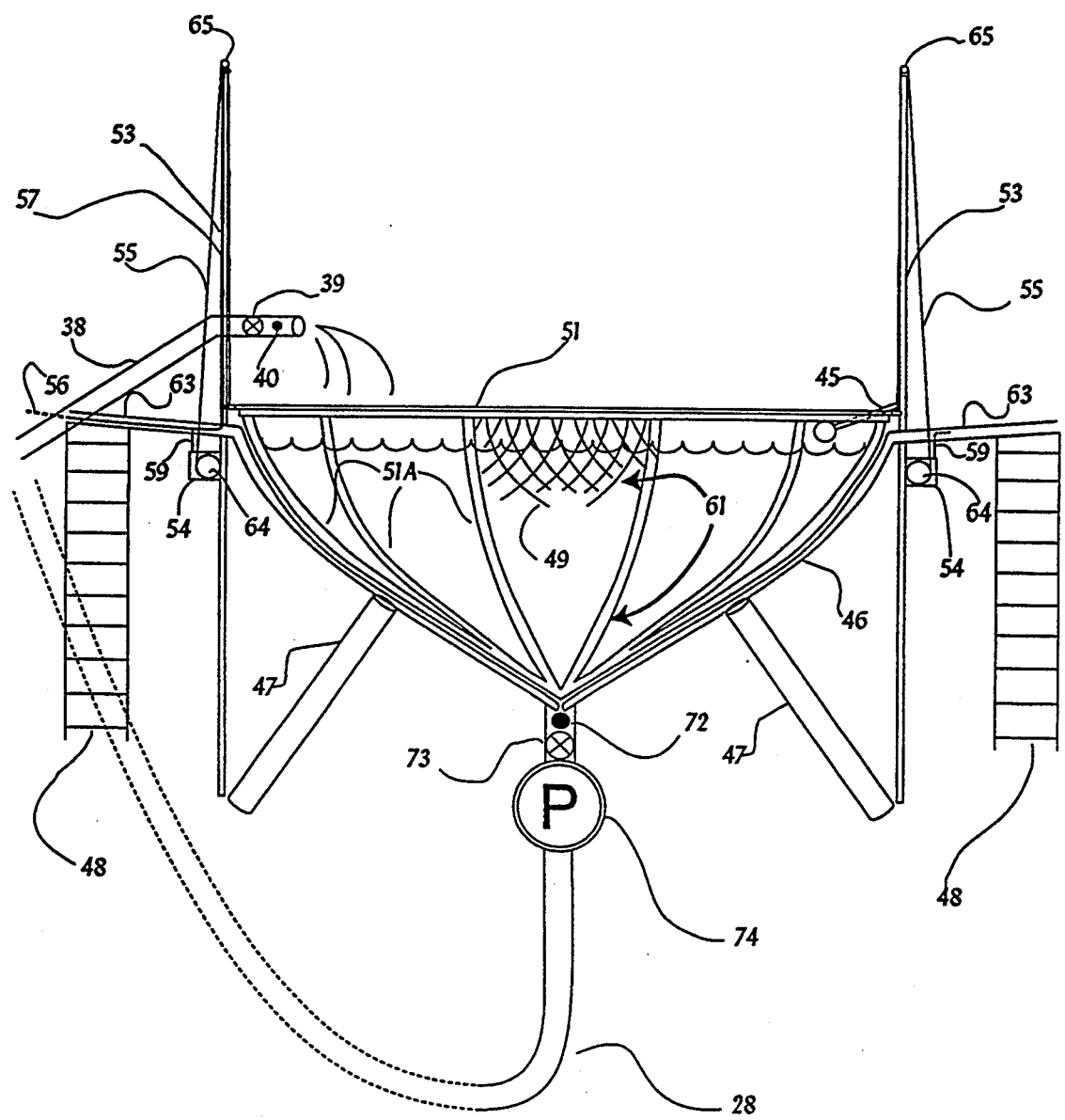
FIG. 6 is a side elevational view of the load tank and filtering system, with the latter in the lowered position (submerged in tank).

Turning to FIG. 6, there is shown a side elevational view similar to the perspective shown in FIG. 1, but focusing on the precipitate-filtering means 61 with load tank 46 and related features. Supports 47 are located below load tank 46. Also shown is conduit 28 draining load tank 46, and continuing towards door access 70 (not shown) where it exits condensation chamber 81. Between conduit 28 and load tank 46, are temperature sensor 72, shut-off valve 73, and pump 74, which control the recycling system as described earlier. Visible in cross-section is walkway 63, whose left terminus, in this perspective, hides the view of gangplank 69. That same left terminus would also ordinarily block view of electrical supply 56, however the latter feature is included to allow a better understanding of its relation to other electrical supply lines inside condensation chamber 81 to be described shortly. Maintenance ladders 48 at the extreme left and right of FIG. 6. As was seen from FIG. 4, the maintenance ladder 48 farthest from door access 70 is attached directly to the terminus of walkway 63, while the one closest to door access 70 is attached to gangplank 69, although this difference in placement is not visible in the perspective of FIG. 6.

Figure 10:
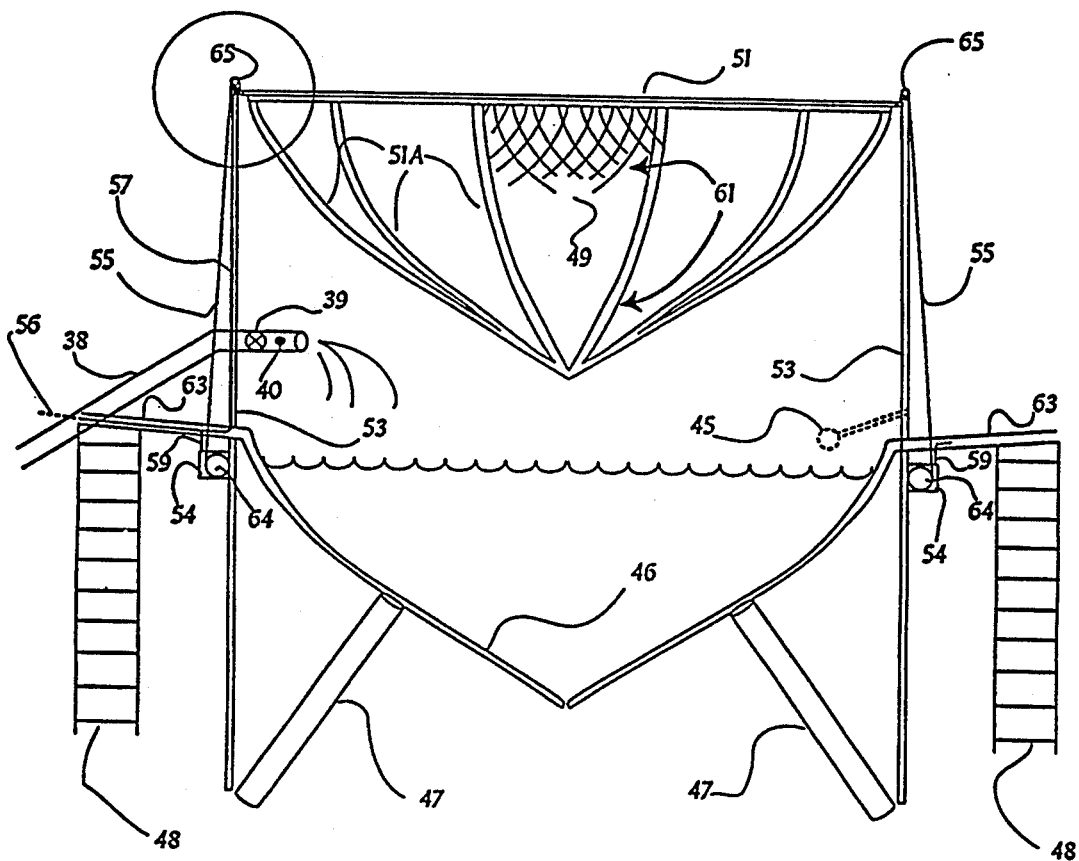
FIG. 10 is a side elevational view similar to FIG. 6, but with the filtering mechanism in an elevated position.
Figure 11:
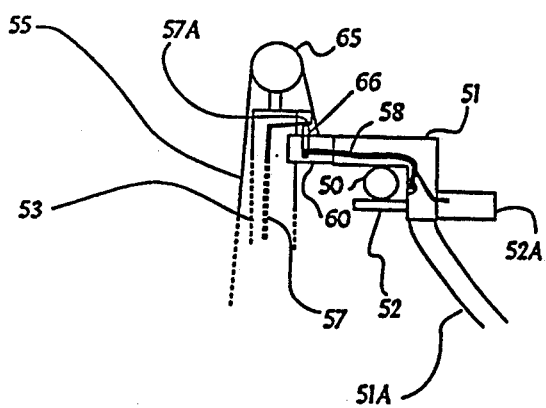
FIG. 11 is a detailed sectional view of the pulley and electrical supply mechanisms engaged, as shown in the upper left-hand corner of FIG. 10.

Towers 53 are clearly visible immediately to either side of load tank 46, although they are not attached directly to it. Instead, in concert with pulleys 65, located at their apex, towers 53 operate as a fulcrum to assist in the lifting of precipitate-filtering means 61 as will be detailed later. Also involved in the lifting task are cables 55, which are anchored by reels 64 at one end, hung over pulleys 65, and attached to precipitate-filtering means 61 at the other end, the precise manner of which will also be seen shortly when FIGS. 10 and 11 are discussed. Reels 64 are powered by motors 54, which are in turn powered by electrical supply 59, which is fed by electrical supply 56, as shown earlier under FIG. 4. Electrical supply 57 is also fed by electrical supply 56, but instead of energizing motors 54, it climbs tower 53 nearest door access 70, the purpose of which will be seen momentarily. The components of precipitate-filtering means 61 seen here in better perspective than in FIG. 4. Frame 51, with its converging, downwardly-oriented spokes 51A, is clearly visible, and positioned fully within the inner cavity of load tank 46. Also shown is filter net 49 in a cut-away view. The remaining features of FIG. 6 have all been described earlier. Conduit 38 is depicted with an upward-oriented distortion, so its view might not be blocked by walkway 63, gangplank 69, as well as tower 53, the latter of which would prevent viewing the terminus of said conduit 38. Shut-off valve 39 and temperature sensor 40 are both shown with conduit 38, and water-level sensor 45 is visible on the opposite side of load tank 46.

Figure 7:
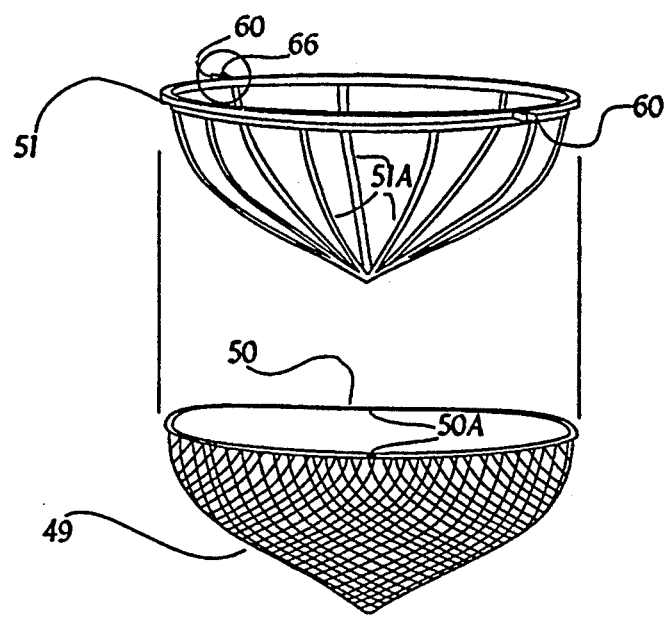
FIG. 7 is a side elevational view of the components which comprise the filtering mechanism.

Looking at FIG. 7, the viewer is presented with an illustration of the two main components of precipitate-filtering means 61 in a disengaged state: In the upper portion of the drawing shows frame 51 with spokes 51A. At opposite sides of frame 51, we see frame-tower guides 60, which are physically adhered and essential to the operability of precipitate-filtering means 61. The precise description of guides 60 will be covered during discussion of FIGS. 8, 9, and 11, but for now suffice it to say that their orientation should be such that they are each in the immediate proximity of towers 53. Also identified in FIG. 9, is contact switch 66, which should be located on the one guide 60 closest to door access 70. A better view of said guide 60 and of contact switch 66 will be had at FIGS. 8, 9, and 11. Positioned below frame 51, is filter net 49, which is attached to rim 50. Said rim 50 includes hinges 50A, to allow closure of filter net 49 in a fashion not unlike a woman's purse. As the drawing indicates, rim 50, and its attached filter net 49 are designed to fit directly underneath frame 50 and spokes 51A, as would a sock.

Figure 8:
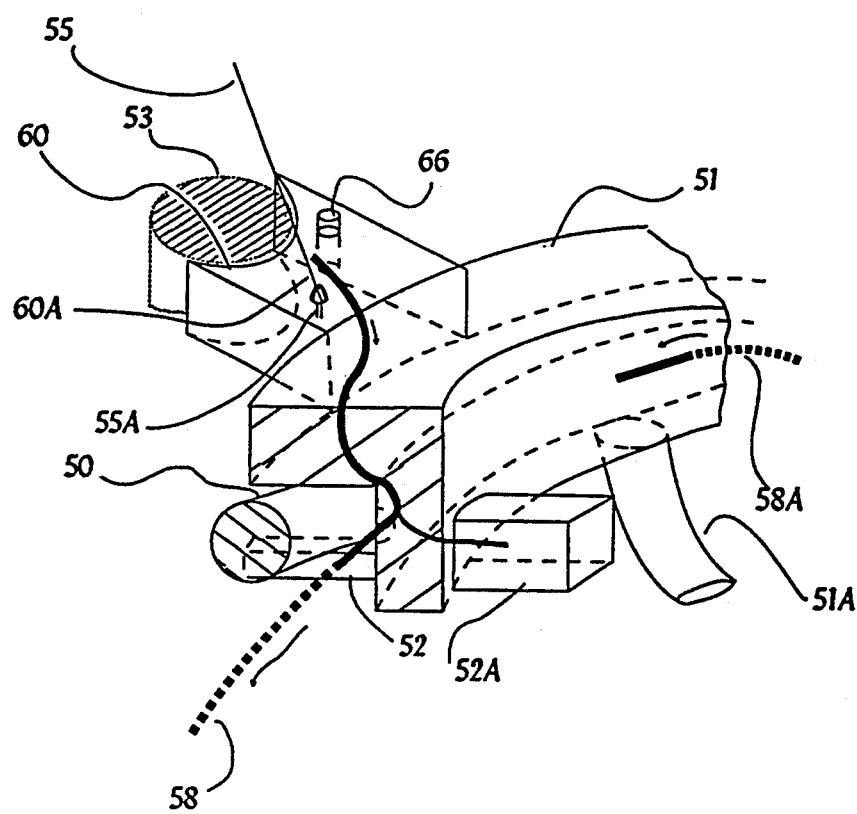
FIG. 8 is a detailed sectional view of the mechanism by which the components of the filtering mechanism are combined for operation.
Figure 9:
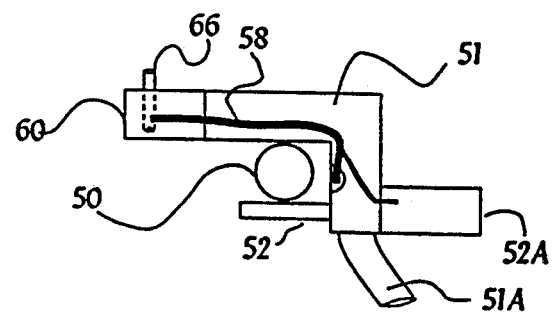
FIG. 9 is a side sectional view of the mechanism illustrated at FIG. 10.

The manner in which these components become reliably engaged and disengaged is shown at FIG. 8, which is an enlargement of the area circled in the upper left hand corner of FIG. 7. Here we can see a section of frame 51, from the bottom of which extends spoke 51A, and to the left of which is attached the guide 60, closest in proximity to door access 70. Guide 60 is depicted here in the shape of a rectangular solid, with its outer end modified to a concave shape. The purpose of this is to partially surround towers 53 shown in phantom, with the concave side of guide 60 such that movement by precipitate-filtering means 61 is restricted solely to vertical motion. Although, this can also be accomplished through more complex means, the approach depicted here is used to avoid undue complication. At point 60A, guide 60 (and therefore frame 51) is attached to cable 55 through use of eye bolt 55A. Centrally positioned partially inside of the illustrated guide 60, is contact switch 66, its lowest point being in contact with one terminus of an uninterrupted length of electrical wiring which serves as electrical supply 58. This electrical supply 58 is represented by a solid line which graduates to a dotted line, and said electrical supply 58 travels the entire circumference of frame 51, returning at the far side of FIG. 8 as electrical supply 58A. Electrical supply 58 feeds power to solenoid housing 52A, which allows solenoid 52 (and a plurality of others distributed along the perimeter of frame 51, and powered in like manner) to extend or retract into housing 52A. As can be seen, rim 50, which is attached to filter net 49, fits directly under frame 51, and is held in that position by solenoid 52 when in its extended position. It should be noted that the other guide 60, located directly opposite thereof, is not visible in FIG. 8, and is identical in all respects to the feature depicted here, save that it lacks a contact switch 66.

To further illustrate the relationship of the components just described, FIG. 9 provides another sectional perspective of the same parts.

FIG. 10, on the other hand, presents an identical perspective as FIG. 6, except it illustrates said precipitate-filtering means 61 in its elevated state. All features in FIG. 10 are otherwise exactly as they were described in FIG. 6. The upper left-hand corner of the drawing depicts a circled area which represents the area on enlarged illustration provided by FIG. 11. There we see in enlarged detail how the components described at FIGS. 7–9, come into play with tower 53, cable 55, and electrical supply 57. As was explained a moment earlier, electrical supply 58, follows the perimeter of frame 51, and energizes solenoids 52 to allow engagement and disengagement of rim 50. In FIG. 8, it can be seen that said electrical supply 58, by way of bump switch 66, makes electrical contact with electrical supply 57 at its contact point 57A. This permits electrical supply 58 to transmit electrical current only when precipitate-filtering means 61 is in a completely elevated state.

Figure 12:
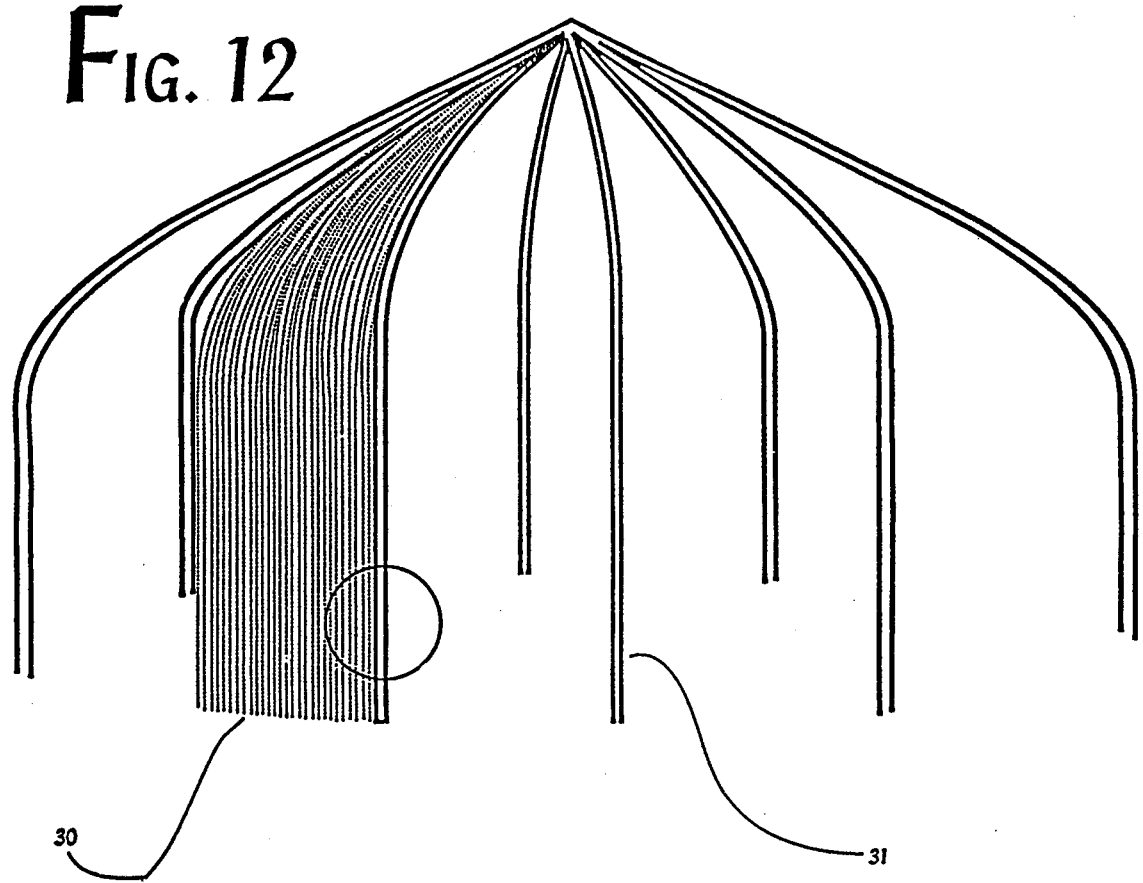
FIG. 12 is a partial illustration of the support system adding structural integrity to the dome.
Figure 13:
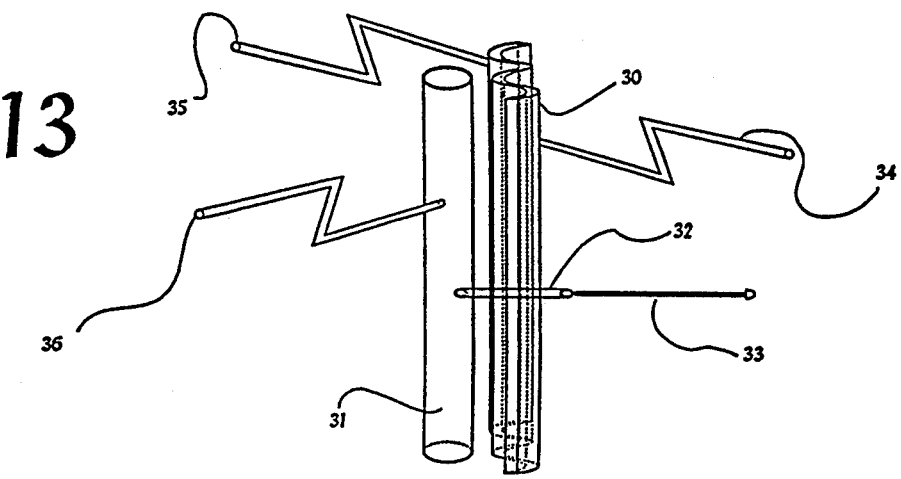
FIG. 13 is an enlarged side view of the manner in which the dome and its structural supports are attached to minimize corrosion.

We now turn to FIGS. 12 and 13, which address the structural stability of dome 30, as well as its ability to resist corrosion. FIG. 12 illustrates only support frame 31, with the corrugations 30A of dome 30 represented in cut-away form just within the perimeter described by the circular based of support frame 31. The circular area near the base of support frame 31, refers to FIG. 13, which provides an enlarged side view of said circular area. In FIG. 13, a section of both dome 30 and support frame 31 are shown to be in close proximity, yet not in immediate physical contact. Attachment of the former to the latter occurs by way of bolts 33, which rest inside insulating sheaths 32 which are made of an electrically insulating material, which in turn are pushed through holes in both dome 30 and support frame 31. In this way, there is no metal-to-metal contact between either dome 30 and support frame 31 that would cause one or the other to act as a sacrificial anode. Further, FIG. 13 also illustrates that there is a plurality of sacrificial anodes (labeled as 34, 35 and 36 respectively) provided for the internal and external surfaces of the dome 30 as well as for support structure 31.

Figure 14:
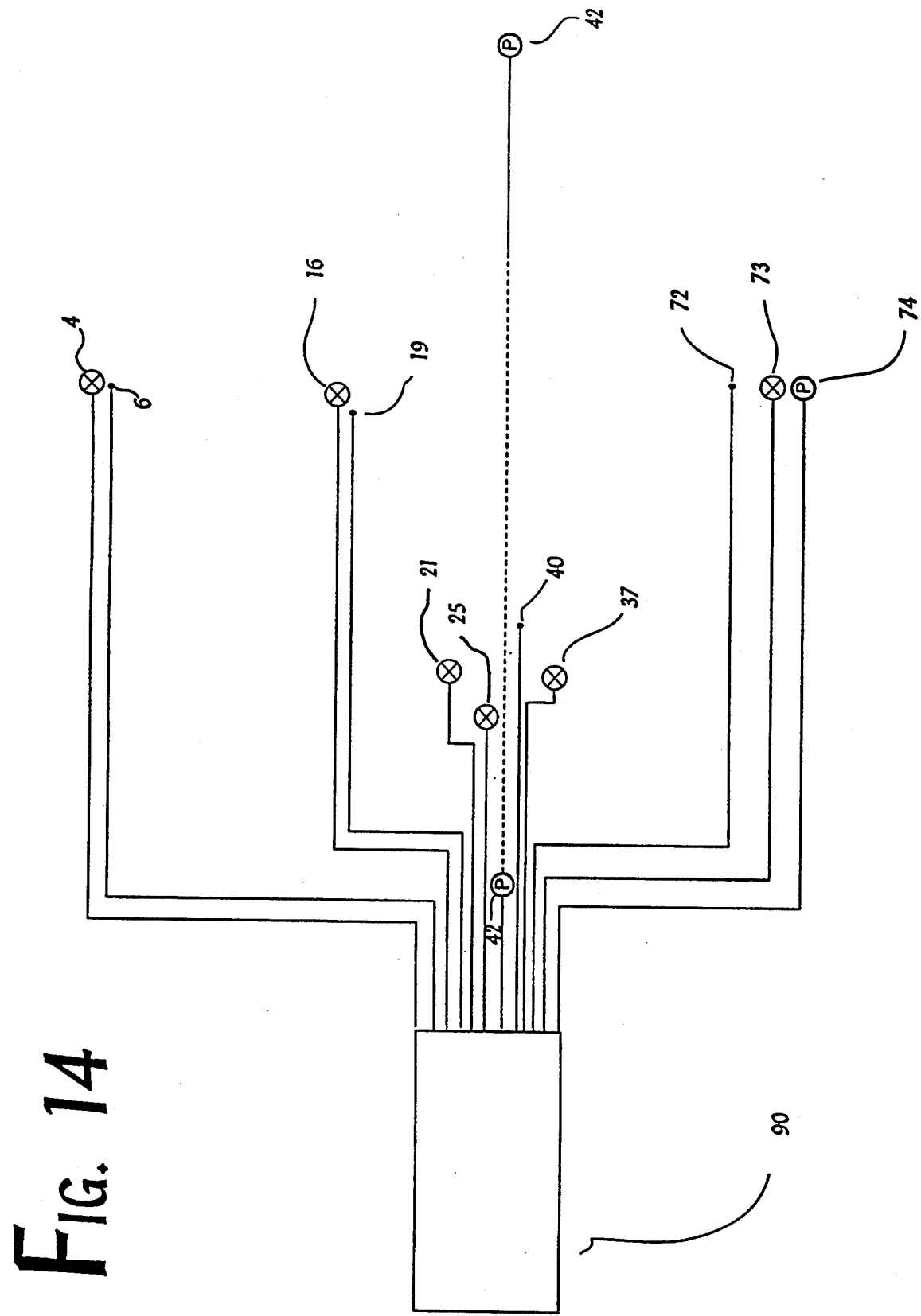
FIG. 14 is a schematic view of the relationship between the controlling, computer and the components under its control.

Lastly, before describing the operation of the instant invention, it should be mentioned that efficient operation of same depends on control of the pumps and switching valves described herein by computer 90, as shown schematically in FIG. 14.

OPERATIONAL DESCRIPTION OF THE DRAWINGS

For an overview of operation, the reader should first turn to FIG. 1. The basic operation of the instant improved water purification device 78 depends on the computerized and synergistic interplay between the three preheaters 80, 79, and 23, which are powered via heat exchange, solar/ambient heat, and commercial energy, respectively. Essentially, before commercial energy need be expended to raise load temperature to a predetermined level sufficient for vaporization, heat exchange and/or solar/ambient heat energy is used to raise the temperature of load as much as possible, thus drastically reducing the expenditure (and expense) of commercial energy. The aforesaid predetermined temperature level for vaporization (henceforward, "PTLV") would vary depending on several factors (i.e. load salinity, distillate product output or energy expenditure desired, etc.), and could be changed by the operator of the device by way of computerized control.

The device is initially charged when pumps 42 force fresh, cold load into first preheater 80. This is the coldest load in the system, since it has not been exposed to any of the preheaters in the apparatus. (It should be noted that pumps 42 perform virtually all of the non-recycling load-movement work in the system, by way of their load-injection action at the base of first preheater 80, since this in turn pushes load up through the rest of the system, as will be seen.) Pumps 42 continue forcing fresh load into first preheater 80, which in turn forces previously injected load further into the system through conduit 17 and past switching valve 16, which is positioned to allow load through, while blocking conduit 18. As load continues to be injected by pumps 42, load is forced still further through conduit 15, to second preheater 79, which is filled to its highest point in this manner. At this stage, pumps 42 are momentarily deactivated while readings taken by temperature sensors 6 and 19 allow the computer 90 to determine whether first preheater 80 or second preheater 79 has the warmest load temperature.

Where, as is likely to be the case immediately after initial system-charging, the reading at temperature sensor 19 is equal to or higher than at temperature sensor 6 but less than PTLV, the computer 90 closes switching valve 16 to conduit 17, opens switching valve 21 only to conduits 20 and 22, and reactivates pumps 42. This valve alignment forces load from the uppermost levels of first preheater 80, where its warmest load will have pooled, through conduits 20 and 22 to third preheater 23, which is filled in this manner, whereupon pumps 42 are deactivated. This bypasses second preheater 80 for two reasons: 1.) It has colder load which third preheater 23 would have to wastefully expend more energy to heat; or 2.) Even where its load temperature is equal to first preheater 79, pumps 42 must fight gravity more (and so work harder) to move its load through the system when compared to load movement from first preheater 79, and effort that is not warranted where the easier-to-move load of first preheater 79 is of equal temperature.

Third preheater 23 then brings its contents to PTLV. At that time, the computer 90 receives another reading from temperature sensors 6 and 19, and opens switching valve 37 only to conduits 24 and 38. If by this time the reading at temperature sensor 6 is higher than at temperature sensor 19 (regardless of PTLV), the computer 90 also changes the position of switching valves 4, 21 and 16, such that the first is set to allow flow of load only from conduit 5 to conduit 7, the second is open only to load flowing from conduit 7 to conduit 22, and the third is open only to load flowing from conduit 17 to conduit 15. Then the computer 90 reactivates pumps 42, forcing the warmest load pooled at the apex of first preheater 80 into the bottom of second preheater 79, via conduits 17 and 15. This in turn forces the warmest load pooled at the apex of second preheater 79 through conduits 5, 7, and finally 22, into the bottom of third preheater 23. Lastly, this causes the hottest load of third preheater 23 to be injected through conduits 24 and 38, thus pouring load at PTLV into load tank 46. Since load tank 46 will initially be empty, water-level sensor 45 will be at its lowered position, and thus shut-off valve 39 will be positioned to allow load to move freely through conduit 38. Once load tank 46 fills, however, water-level sensor 45 will gradually be raised, which will gradually close off the flow of load through shut-off valve 39 until load tank 46 is completely full. At this time, shut-off valve 39 will be in a fully closed position, causing the computer 90 to deactivate pumps 42. It should be noted that if, prior to the reactivation of pumps 42 described in this paragraph, the computer 90 finds that readings at temperature sensor 19 are still equal to or higher than at temperature sensor 6, then switching valves 21 and 16 would not be changed, second preheater 79 would again be circumvented, and the flow of load into third preheater 23 would take place from first preheater 80, as described in the previous paragraph.

Once full, the contents of load tank 46 will change in three ways: 1.) as load cools, the cooler contents of load tank 46 will sink to and pool in the lowermost vertex of said load tank 46; 2.) the hottest load will evaporate, thereby gradually lowering the fill-level of load tank 46; and 3.) as this happens the water content in the remaining load will decrease, its contaminants will become increasingly concentrated and then precipitate as solids when saturation approaches. The first of these changes is addressed in the following manner. Temperature sensor 72, located at the bottom of load tank 46, monitors the progress of the load-cooling process, and provides the computer 90 with this information. When a certain preset cooling level (henceforward, "PCL") has been reached below PTLV, the computer 90 takes a reading from temperature sensor 19 only. If that reading is higher than PCL, then the computer 90 changes the position of switching valves 25 and 16, such that the first only allows load to flow from conduit 28 to conduit 18, and the second only permits flow from conduit 18 to conduit 15. On the other hand, if the reading from temperature sensor 19 is lower than PCL, then only switching valve 25 is modified, and then only to allow flow from conduit 28 to conduit 26. Regardless of which option is chosen by the computer 90, it opens shut-off valve 73 to allow free flow of load, and activates pump 74, thus forcing cooled load through conduit 28 and then to either conduit 26 or conduit 18. As a result, load cooled below PCL is recycled for reheating either to second preheater 79, or to third preheater 23, depending on whether or not the latter can contribute additional heat to the recycled load. First preheater 80 is circumvented entirely by the recycling system, since it is desirable to avoid adding heat from recycled load to the contents of first preheater 80, as will be explained shortly.

Regardless of which option the computer 90 selects and of the preheater destination of the recycled load, said load displaces pre-existing load in the corresponding preheater, and that load is in turn pushed further through the system in a manner consistent with the processes described above. For example, if the reading at temperature sensor 6 is below PTLV (despite being higher than PCL and thus meriting use of second preheater 79 by the recycling system) the computer 90 merely makes the necessary switching valve positionings needed to maneuver the displaced load to third preheater 23, and this then displaces PTLV-heated load which flows into load tank 46. In this way, the quantity of load removed from load tank 46 by the action of pump 74 is replaced by an equal quantity emerging from conduit 38. When temperature sensor 72 detects load temperature at PTLV, the computer 90 deactivates pump 74, and closes shut-off valve 73, thereby deactivating the recycling system until such time as temperature sensor 72 again reads load temperature at PCL.

Before proceeding, it should be noted that the apparatus may occasionally be faced with a need to remove cooled load at the bottom of load tank 46 before preheater 23 (or even second preheater 79, see discussion two paragraphs below regarding its use to the exclusion of third preheater 23) has had the opportunity to raise its contents to PTLV. In that event, activation of the recycling system would force load into load tank 46 before same could be raised to the appropriate temperature. This time-lag problem may be remedied through two possible alternatives which are not mutually exclusive: 1.) The precise model or type of third preheater 23 used should be selected by its ability and speed of heating such that it will match the timing of the load-cooling process in load tank. For instance, if the system is implemented on a large scale, then a small propane heater (or one with lower thermostat settings) may find a higher incidence of the aforesaid time-lag. The converse is also true, since a small embodiment of the device will not require a powerful third preheater 23. 2.) While FIG. 1 depicts the apparatus as having only one second preheater 79, it might be advisable to have two or more second preheaters 79 and third preheaters 80 which remain empty as backups, but which are available to receive cooled recycled load for passive reheating, without the concomitant premature displacement of as yet insufficiently heated load from the active preheaters. This would have the effect of lowering the load-level in load tank 46, thus requiring an override instruction from the computer 90 to prevent water-level sensor 45 from triggering such premature load displacement through fresh-load injection by pumps 42 (see next paragraph). A less-desirable remedy to the time-lag problem would be the downward resetting of the PCL threshold: Since contents in load tank 46 will be allowed to cool longer before triggering the recycling process, this would give the hottest/active preheater more time to bring its contents to PTLV. This remedy, however, would tend to result in lower mean temperatures in load tank 46, with a concomitant reduction in distillate output.

To address the second change described above as taking place in load tank 46, if evaporation has reduced load level in load tank 46 beyond a preset level (before or after completion of the recycling re-fill process), this will be recognized by water-level sensor 45. In response, the computer 90 will take comparative readings of temperature sensors 6 and 19, adjust valve positionings accordingly, and then again reactivate pumps 42 to inject fresh load into first preheater 80. As described earlier, this sets in motion a progressive chain of load displacement that results in more PTLV-heated load being emitted by conduit 38 into load tank 46, thus "topping off" the load level. At that point, water-level sensor 45 would monitor this event and the computer 90 would deactivate both pumps 42 and close shut-off valve 39.

As can be seen, the system operates through continuous computerized monitoring and feedback to allow selection and exploitation of the hottest load-source prior to that load's introduction into third preheater 23, thus relegating the use of commercial energy to a supplemental role only during both recycling or initial processing. But in fact, the system is designed to have the flexibility to entirely circumvent the use of third preheater 23 and its expenditure of commercial energy during such periods when either preheaters 79 or 80 or both produce load temperature at or above PTLV. For example, if the computer 90's comparative reading of temperature sensors 6 and 19 show that second preheater 79 contains load at temperatures which exceed both the reading of temperature sensor 6 and PTLV, then the positioning of valves 4, 21 and 37 are set such that load movement can only flow from conduit 5 to conduit 7 to conduit 27, and then on to conduit 38 and load tank 46. Similarly, in the unlikely event that first preheater 80 should produce load temperatures at or above PTLV, the computer 90 would circumvent both second and third preheaters 79 and 23, and position valves 21 and 37, such that load would only flow through conduit 20 to conduit 27 and then on to load tank 46 via conduit 38. Second preheater 79 would not be included in such an alignment for two reasons alluded to earlier: 1.) load from first preheater 80 requires less work to move than would be the case for second preheater 79, and 2.) for reasons which will be covered momentarily, it is highly desirable to keep the temperatures in first preheater 80 as low as possible and it is advantageous to use this opportunity to replace unusually hot load contents with cool, fresh load injected by pumps 42.

Turning now to the third change described earlier as affecting the contents of load tank 46, as will be seen, the apparatus has an ongoing means of removal and recovery of contaminants from load that both allows exploitation (or if necessary, safe disposal) of contaminant by-products and maintains the load in the system in liquid state without precipitates. As a result, the apparatus never needs to discharge or dispose toxic brine as a by-product, since it is never allowed to exceed the contaminant saturation point and is perpetually re-diluted with fresh, relatively unsaturated load whenever evaporation reduces water volume and content. The contaminant-retrieval function can best be followed by looking at FIGS. 6–11, with an additional, overhead perspective from FIG. 4.

Said contaminant-retrieval function is based on a two-part filtering system 61, composed of an extremely fine-weave filter net 49 and a frame 51, which can be seen in their disengaged state at FIG. 7. As can be seen, filter net 49 fits under frame 51 and its spokes 51A, the latter of which create a contour closely matching the inside shape of load tank 46, and thus act to give filter net 49 that same shape. When these two components are engaged and then lowered into load tank 46 (as seen in FIG. 6). the effect is such that virtually all the load in load tank 46 rests inside the contours of filtering system 61. This has two desirable results: First, whenever the load-recycling system is activated and pulls load from the bottom of load tank 46, said load must first pass through filtering system 61, thereby assuring that any solid contaminant-precipitates accumulated in load tank 46 remain behind and are not introduced into the conduit and preheater networks. The load that emerges will be at or close to the saturation point, but will be liquid and unlikely to precipitate further since water content will not fall again until the load returns at PTLV into the load tank, and indeed will be diluted considerably when mixed with less saturated, fresher load injected into the system by pumps 42 to "top off" the system's load content, and residing throughout the system. Second, when the precipitates remain trapped in load tank 46, surrounded by filtering system 61, it is a simple matter to remove them entirely from load tank 46 by physically lifting the entire filtering system 61 vertically in a manner not unlike fishing with a seine net. As can be observed from FIG. 10, the contaminants would be dragged vertically along with filter net 49. They would then drain briefly, and as will be detailed in a moment, filter net 49 would be disengaged electrically from frame 51, which would be immediately re-engaged with a fresh and empty replacement filter net 49, and lowered back into load tank 46. The just-disengaged filter net 49 would be closed like a purse along hinges 50A, and would be removed from condensation chamber 81, via gangplank 69. Said gangplank 69, seen in cross-section at FIG. 5, has a depression or trough running centrally along its length, one end of which is in seamless contact with load tank 46 and lower than the other end. As a result, any load that might drip from just-disengaged filter net 49 as it is removed from condensation chamber 81 would find its way back into load tank 46, thus avoiding contamination with distillate accumulating in condensate collecting tank 82 below. Upon removal from the apparatus the precipitates can be handled, stored, processed or exploited as needed.

Having reviewed the basic operation of filtering system 61, we will now describe how the components of same are disengaged and re-engaged, and how it is raised and lowered. As shown by FIGS. 7–9 and 11, the angled rim of frame 51 is evenly studded throughout its circumference with a plurality of outwardly-pointing, horizontally-arranged solenoids 52. Attached and extending from rim of frame 51 at diametrically opposite ends, are guides 60 which are lifted by the pull of cables 55 on eye bolts 55A with the assistance of pulleys 65 and guided along towers 53, thereby also stably lifting frame 51. Further, as described before, inside the rim of frame 51 and throughout its circumference is contained an electrical supply 58 which feeds each solenoid 52 unit, and which originates at the guide 60 closest to door access 70 where it contacts contact switch 66. Running internally through the length of the tower 53 closest to door access 70, is electrical supply 57. Pull on cables 55 occurs when reels 64 are wound by motors 54, and power is supplied to said motors 54 via electrical supply 59. Both electrical supplies 57 and 59 are in turn energized via electrical supply 56, originating outside condensation chamber 81. When elevated to its maximum level, electrical supplies 57 and 58 make contact via contact switch 66, and it is only at this point and in this position that electrical supply 58 can be availed of electricity when a current is fed from below by activation of on/off switch 67. Activation of such a current operates to retract solenoids 52 into their housings 52A.

At this stage, the rim 50 of filter net 49 is fitted under and around frame spokes 51A until rim 50 rests directly in contact below the angled rim of frame 51. Since frame 51 and spokes 51A prevent rim 50 from free horizontal movement, only vertical freedom is available to rim 50, and thus to filter net 49. This vertical freedom is in turn also eliminated when on/off switch 67 breaks current flow into electrical supplies 57 and 59, thereby causing the solenoids 52 to emerge from their housings 52A directly below rims 50. Thus filter net 49 is firmly engaged to frame 51, and since lack of current can only occur when filtering system 61 is fully raised, said engagement will persist reliably at all times when filtering system 61 is lowered into load tank 46.

All primary operational aspects of the instant invention have now been described, and we now turn to description of the function of miscellaneous attributes that distinguish the instant invention over previous designs.

Visible in FIG. 1, pumps 42 and conduits 41 are situated to inject fresh load at the lower levels of first preheater 80, rather than near its uppermost region. This is beneficial for the following reasons: It is desirable to maintain the interior surface of dome 30 as cool as possible so water vapor condensation may be enhanced. However, the act of condensation itself transfers heat energy to the internal surface dome 30, and from there to its external surface, and so tending to defeat efforts to reduce dome 30 temperatures. Nevertheless, first preheater 80 is filled with fresh load, which is the coldest load in the entire system, and which comes into direct contact with the external surface of dome 30, thereby effectively absorbing its heat and cooling it. As mentioned earlier, after absorbing the heat from dome 30, the warmed load rises relative to the surrounding load, and tends to pool at the apex of first preheater 80, whereupon cooler load replaces it and again comes into contact with the external surface of dome 30, perpetuating the process. Thus the colder the load temperature in first preheater 80, the better condensation is enhanced inside the dome 30. It is also desirable to preserve the load stratification or pooling described above for two reasons: first, it is easier to exploit the recaptured heat if all of the warmest load can be evacuated from one confined area, and second, stratification confines the coldest water along the lower levels of first preheater 80 where it continues to efficiently cool the walls of dome 30 (although, by corollary, cooling efficiency gradually decreases in the upper levels of the structure, there is less corrugated surface area for condensation and so less impact on cooling efficiency). Mixing the contents of first preheater 80 would defeat both benefits, since all contents would tend to have the same temperature, preventing both efficient cooling and exploitation of recaptured energy.

The positioning of conduits 41 at the bottom of first preheater 80 provides greater control over the maintenance of cooler temperatures and the efficient evacuation and exploitation of recaptured heat energy. Fresh load introduced at higher levels of first preheater 80 would be heavier than the surrounding warmer load, would be forced to sink through those warmer strata, would thus itself be warmed by such admixture, and would encourage undesirable overall mixing as well. On the other hand, low-level positioning and injection of fresh load into first preheater 80 assures that this load will enter at the lowest levels, where it would remain to create its own strata and retain its status as the coldest in the system. In so doing, it would displace warmer, higher strata upwards in a less disruptive manner, ultimately pushing the warmest strata out of first preheater 80 into the appropriate conduit on its way to the preheater selected by the computer 90.

Contouring outer tank wall 29 to follow the contours of dome 30, as well as placing exit conduits 17 and 20 at the apex of the structure, both further facilitate the removal of the most heated load from first preheater 80. Whereas a cylindrical contour would concentrate the warmest strata over a broad area uppermost in the structure, a cone or dome-shaped contour allows very concentrated and directed placement of the warmest strata at the apex of the structure from where they can be precisely removed by the aforesaid conduits without disturbing cooler strata below. Compared to a cylindrical shape, the dome-contour design in first preheater 80 also reduces the structural stress on dome 30 caused by the weight of load (see also discussion below), by evenly distributing the volume of load throughout the structure and avoiding the concentration of large volume solely at the upper levels where structural support is weakest.

Second preheater 79 has parallel modifications that give it advantages analogous to those just mentioned for first preheater 80, as well as features which enhance its performance and increase its exploitation of ambient-/solar infrared radiation. The positioning of second preheater 79, such that only one corner is lowermost, ensures that the warmest load strata pool at the uppermost apex for easy and precise evacuation though conduit 5. Likewise, as was the case with first preheater 80, performance by second preheater 79 benefits when the coldest load is introduced at the lowest point of the structure, where the incoming outlet of conduit 15 is located. Ambient and solar infrared collection is increased by two features: the use of low-emissivity glass panes 11 which resist the re-radiation and escape of infrared radiation from inside the structure by reflecting said radiation back into it, and the use of Fresnel lenses 13 over panes 11 to help concentrate radiation into the structure without adding undue bulk or weight. Both first and second preheaters 80 and 79 have temperature sensors 19 and 6, respectively, located at their apices where their readings most accurately reflect the temperature of the hottest load in each structure, and increase the computer 90's effectiveness in making load-routing decisions.

Within condensation chamber 81, a semi-circular, rather than fully circular, walkway 63 provides the necessary access for maintenance and operation, while adding less weight and strain to structures bearing the weight of walkway 63, and a reduced construction expense. Ladders 48 allow easier access to condensate collecting tank 82. Placement of distillate storage tank 76 above ground, rather than underground burial of this component, facilitates maintenance access and initial installation and costs. Further, structuring all egress and ingress of conduits, electrical supply and human access through a single door access 70 reduces the incidence of obstructions to the corrugations 30A of dome 30 which would reduce condensation area and efficiency, and which would interfere with the smooth downward flow of condensate into condensate collecting tank 82.

Lastly, the instant invention implements features to resist structural stress and corrosion. Support frame 31 occupies relatively little space yet meaningfully braces dome 30. This component, working in tandem with the more evenly-distributed weight inherent in the dome-contoured design of first preheater 80 (see above), combines to give dome 30 greater structural strength. This in turn allows thinner copper sheets to be used, which not only dramatically reduces construction costs but also enhances heat exchange efficiency. Further still, the increase in structural integrity allows the operator the option of yet another strategy to increase evaporative efficiency: decreasing air pressure inside condensation chamber 81, thereby allowing greater vaporization at lower temperatures and higher salinity. Finally, the insulation from physical and electrical contact between dome 30 and support frame 31 operates to avoid galvanic corrosion that would cause the support frame to act as a sacrificial anode. To further reduce corrosion, a plurality of true sacrificial anodes 34, 35 and 36 would be placed at appropriate places on the inner surface of dome 30, on its outer surface, and on the surface of support frame 31. The incidence of corrosion can be minimized even further through application of electrical current according to standard anti-corrosion techniques used to protect buried gas and utility pipelines.

While the invention has been thus described in its preferred embodiment, it should be understood that the words which have been used are words of description rather than limitation and changes may be made within the purview of the appended claims without departing from the full scope or spirit of the invention.

Having thus described our invention, we claim:

1. An improved solar water purification system comprising: upper domed structure means and distillate collecting means positioned below said domed upper structure means; load tank means centrally located within said distillate collecting means and spaced a predetermined distance therefrom; load supply means including first, second and third preheater means with appropriately positioned temperature and load level sensors, valves, pumps and conduits for selectively adding heat to said load prior to or after its delivery to said load tank means; said second preheater means comprising a solar energized preheater; said upper domed structure and distillate collecting means located beneath the earth's surface while said second and third preheater means are located externally of said earth's surface; and control means for determining and controlling the flow path and quantity of said load relative to said first, second and third preheater means and said load tank means whereby maximum advantage is taken of said second preheater means under optimum solar conditions allowing sufficient heat to be added to said load to permit evaporation in said load tank, followed by condensing on the inner surfaces of said upper domed structure with subsequent gravitational flow of the condensate down said inner surfaces of said upper domed structure into said distillate collecting means.

2. An improved solar water purification system as defined in claim 1 wherein said load tank means comprises a load tank centrally positioned within and spaced a predetermined distance from said distillate collecting means; said load tank including a centrally located discharge outlet at its lowermost point and a plurality of supporting members for supporting and locating said load tank relative to said distillate collecting means; precipitate filtering means including a filter and supporting frame means conforming to the contour of said load tank means and removably positioned therein; a pair of oppositely positioned towers including motors, pulleys, cables and position sensors for raising and lowering said filter and supporting frame means relative to said load tank means whereby said filter and supporting frame means can be raised from said load tank means when said filter becomes full of precipitate and a clean filter is attached to said supporting frame means and reinserted into said load tank means permitting said precipitates to be removed for further processing, storage, or exploitation and use.

3. An improved solar water purification system as defined in claim 2 wherein said upper domed structure further includes a corrugated dome having internal and external corrugations to increase the condensing and heat transfer surface area; said first preheater means comprising a conforming outer chamber completely surrounding said upper domed structure permitting said load therein to contact the outer surface of said upper domed structure and transfer heat to the load contained therein while simultaneously lowering the temperature of the inner surface of said upper domed structure to assist in the condensation of vapors thereon and increasing the overall system efficiency.

4. An improved solar water purification system as defined in claim 3 wherein said upper domed structure comprises a first annular wall portion, followed by an arcuate portion and a subsequent converging portion terminating in an apex; said annular portion having an access door therein allowing ingress and egress into the confines of said domed upper structure, said load tank means and said distillate collecting means.

5. An improved solar water purification system as defined in claim 4 wherein said load tank means further includes a walkway which peripherally surrounds one-half of said load tank and a gangplank extending from said access door to said walkway for allowing service personnel access to said towers in performing necessary duties.

6. An improved solar water purification system as defined in claim 5 wherein said load tank means further includes a pair of ladders which extend downwardly from said walkway, said ladders located at opposite ends of said walkway to provide access to the lower portions of said distillate collecting tank permitting cleaning or other duties.

7. An improved solar water purification system as defined in claim 1 wherein said second preheater is a solar preheater located externally relative to said upper domed structure and said distillate collecting means; said second preheater comprising a generally rectangular shaped chamber positioned such that one corner forms the lowermost portion thereof; a load inlet conduit operably connected to said lowermost corner for supplying load thereto; a load outlet conduit operably connected to the uppermost corner of said rectangular chamber; discharge conduits and controls for directing load from said second preheater to either said third preheater or to said load tank depending upon the temperature of said load leaving said second preheater.

8. An improved solar water purification system as defined in claim 7 wherein said second preheater further includes a plurality of Fresnel lenses which form the uppermost cover of said rectangular shaped chamber; said Fresnel lenses serving to assist in the concentration of the solar energy on the load within said second preheater; said second preheater further including a first coating of black paint over its internal surfaces to increase the absorption of the sun's energy followed by a second coating of an infrared absorbent polymer to further enhance the absorption of the sun's energy.

9. An improved solar water purification system as defined in claim 3 wherein said corrugated dome structure is made of copper and includes supporting frame means to support the load carried by said upper dome structure.

10. An improved solar water purification system as defined in claim 9 wherein said supporting frame means includes corrosion isolation means to prevent galvanic action relative to said copper corrugated dome and attachment means for securing said copper corrugated dome to said supporting frame means.

11. An improved solar water purification system as defined in claim 10 wherein said supporting frame means includes sacrificial anodes which serve to protect the copper corrugation dome and said attachment means from corrosive galvanic action.

12. An improved solar and ambient heat capturing system comprising: a hollow rectangular-shaped housing exposed to the sun's rays, positioned such that only one corner is lowermost; a load inlet conduit operably connected to said lowermost corner for supplying load thereto to be heated by said sun's rays; a load outlet conduit operably connected to the uppermost corner of said rectangular housing for removing the heated load therein; a first coating of black paint over the internal surfaces of said rectangular housing to increase the absorption of the sun' energy followed by a second coating of an infrared-absorbent polymer to further enhance the absorption of the sun's energy; a plurality of transparent covering means whose internally-facing sides are coated with low infrared-emissivity coating means to further assist in the concentration of the solar and ambient energy thereon and prevent heat loss from the load within said rectangular housing; a plurality of Fresnel lenses forming the uppermost cover of said rectangular housing to further assist in the concentration of the solar energy on the load within said rectangular housing.

* * * * *